Figure 1:
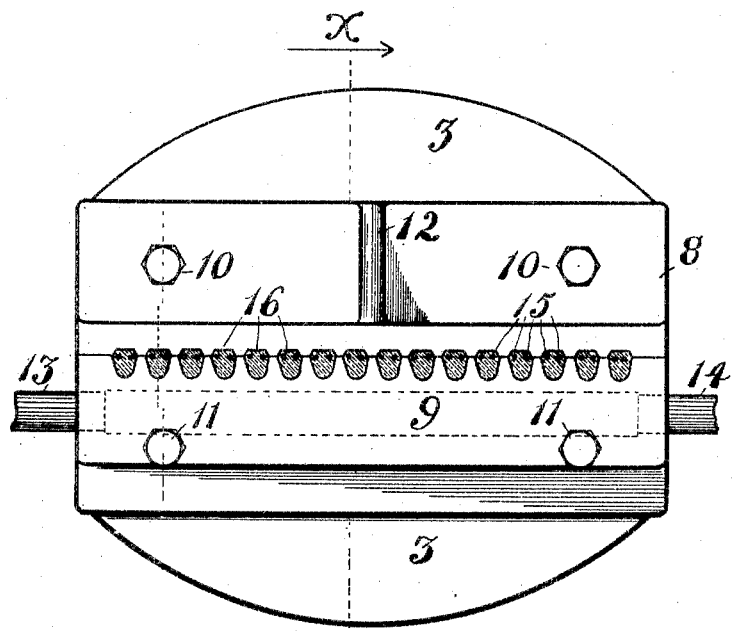

No. 776,819. PATENTED DEC. 6, 1904.
A. J. WHITE.
ATTACHMENT FOR VULCANIZERS.
APPLICATION FILED MAY 23, 1904.
NO MODEL.

Witnesses.
A. E. Kling
M. F. Dungeon

Inventor,
A. J. White,
by C. E. Humphrey.
Atty.

No. 776,819.

Patented December 6, 1904.

UNITED STATES PATENT OFFICE.

ALFRED J. WHITE, OF AKRON, OHIO, ASSIGNOR TO THE WILLIAMS FOUNDRY AND MACHINE COMPANY, OF AKRON, OHIO.

ATTACHMENT FOR VULCANIZERS.

SPECIFICATION forming part of Letters Patent No. 776,819, dated December 6, 1904.

Application filed May 23, 1904. Serial No. 209,233. (No model.)

*To all whom it may concern:*

Be it known that I, ALFRED J. WHITE, a citizen of the United States, residing at Akron, in the county of Summit and State of Ohio, have invented a certain new and useful Improvement in Attachments for Vulcanizers, of which the following is a complete specification.

My invention relates generally to vulcanizers and has a special relation to devices to be attached thereto. The common form in vulcanizers embodies two boxes or sections arranged to register with each other and having through their abutting faces longitudinal grooves partly in each section into which the material to be vulcanized is placed. These sections are provided with chambers into which a heating medium is introduced to cause vulcanization, and the two are clamped together by suitable clamping devices during the process. These vulcanizers being limited in length are only capable of producing indefinite lengths of material—such as tires, hose, &c.—by recourse to the following method, which consists in placing in the vulcanizer-cavities strips of material which protrude considerably from one end and which ends are not cured with the portion in the vulcanizer, but remain green. Each strip is removed after curing and the green unvulcanized end inserted into the opposite end of the vulcanizer and made to abut against the end of an entirely new strip of material, whose end protrudes in the same manner from the vulcanizer that the first one did. The sections after being clamped together again are heated and the green end of the first strip unites during the process of curing to the end of the second strip, and all of the second strip except the protruding end is cured simultaneously with the making of the joint between the two strips. This is kept up until a strip of any desired length is obtained. It has been found difficult to keep the protruding ends of the strips outside of the section cool enough to prevent a partial vulcanization thereof, which interferes seriously with the operation of joining together the ends of the strips, and hence the object of my invention is to place on the end of the vulcanizer a suitable device to prevent a heating or curing of the protruding ends.

To the accomplishment of the aforesaid object my invention consists in the new and peculiar construction, arrangement, and combination of parts hereinafter described, reference being had to the accompanying drawings, which form a part hereof.

Figure 2:
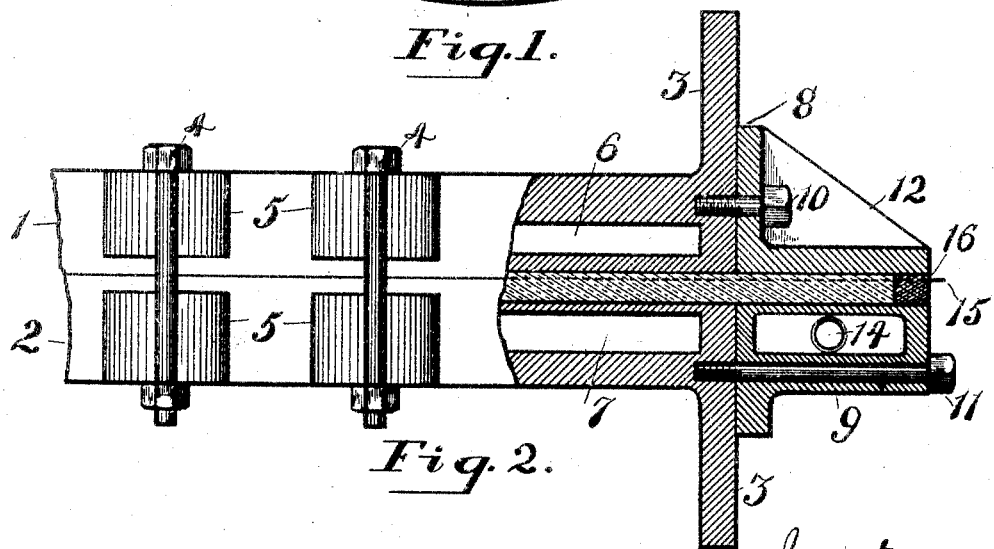

In the accompanying drawings, in which similar reference-numerals indicate like parts in the different figures, Figure 1 is an end elevation of the vulcanizer with my improvement in place, and Fig. 2 a section of my attachment at the line X with a portion of the shell of the vulcanizer broken away to illustrate its internal parts.

In the drawings, 1 and 2 are the upper and lower sections, respectively, of the vulcanizer, and each is provided at its ends and at other suitable places with transverse flanges 3 for strengthening them against bending. These sections 1 and 2 are clamped together in any preferred manner, and the ordinary means used are a series of bolts 4, passing through slotted lugs 5 on both sections. In the sections 1 and 2 are chambers 6 and 7, respectively, into which a heating medium is introduced, causing vulcanization, and mold-cavities for holding the material are cut longitudinally along the abutting faces of the two sections. These are partially in each section in the metal existing between the chambers 6 and 7.

My cooling attachment consists of two parts 8 and 9, held to the ends of the sections 1 and 2 by bolts 10 and 11, and these parts are arranged to meet each other at the middle line between the sections 1 and 2 and are provided along this line with grooves cut into both parts exactly of the configuration of the grooves in the sections 1 and 2 and exactly registering therewith. The upper part 8 is substantially L-shaped in cross-section and is strengthened by an integral brace or web 12. The lower part 9 consists of a box extending across the end of the section 2 and having inlet and outlet pipes 13 and 14 connecting with said hollow parts. During the application of heat to the sections 1 and 2 a stream of cold water or similar substance is forced from one of the pipes 13 or 14 through the hollow in the part 9 and out through the opposite pipe, thus serving to keep the ends of the strips of the material held between the two portions of my device cool enough at all times to prevent a preliminary curing thereof.

When the strips to be vulcanized are intended to be formed with openings extending longitudinally therethrough, as in the case of tires, I place in the outer ends of the grooves in the cooling attachment supports or plugs 16, either of metal, wood, or vulcanized rubber, having openings therein into which are laid wires 15, which are to serve as cores in making the finished article. These supports 16 are readily removable and are used to sustain the wire in place during vulcanization.

What I claim is—

1. A separable attachment arranged on the end of a vulcanizer capable of holding material protruding from the mold-cavities of said vulcanizer and means for cooling said attachment.

2. A separable attachment arranged on the end of a vulcanizer capable of holding an extended end of material normally held in the mold-cavity of said vulcanizer and separable with the sections of said vulcanizer and means to cool one of the parts of said attachment.

3. The combination with the sections of a vulcanizer of a separable attachment, both parts of which are arranged to meet and register with one another in unison with the meeting of the sections of said vulcanizer and means for cooling said attachment.

4. The combination with the sections of a vulcanizer, of a separable attachment, the parts of which are arranged to meet and register with one another in unison with the meeting of the sections of said vulcanizer and means for allowing the passage through one of the parts of a stream of cooling fluid.

5. The combination with the sections of a vulcanizer, of a separable attachment the parts of which are detachably connected with the ends of the vulcanizer-sections and are arranged to meet and register with each other in unison with the meeting of the vulcanizer-sections and means for allowing the passage through one of said parts of a cooling medium.

6. A vulcanizer involving two members capable of being heated and provided with cooling-chambers at the end thereof capable of receiving a cooling medium.

7. The combination of a vulcanizer having mold-cavities formed in the abutting faces of the members thereof and means to heat and cool simultaneously selected portions of said mold-cavities.

8. A vulcanizer involving a plurality of separable members having mold-cavities formed in the abutting faces of said members and means to independently heat and cool selected portions of said cavities simultaneously.

In testimony that I claim the above I hereunto set my hand in the presence of two witnesses.

ALFRED J. WHITE

In presence of—
C. E. HUMPHREY,
M. F. SURGEON.